(12) United States Patent
Onoda et al.

(10) Patent No.: US 11,693,171 B2
(45) Date of Patent: Jul. 4, 2023

(54) DISPLAY DEVICE

(71) Applicant: Japan Display Inc., Tokyo (JP)

(72) Inventors: Ken Onoda, Tokyo (JP); Shinichi Komura, Tokyo (JP); Koichi Okuda, Tokyo (JP); Hiroaki Kijima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/970,578

(22) Filed: Oct. 21, 2022

(65) Prior Publication Data

US 2023/0125438 A1    Apr. 27, 2023

(30) Foreign Application Priority Data

Oct. 22, 2021    (JP) .................................. 2021-173221

(51) Int. Cl.
*F21V 8/00*        (2006.01)

(52) U.S. Cl.
CPC ......... *G02B 6/0038* (2013.01); *G02B 6/0068* (2013.01); *G02B 6/0076* (2013.01)

(58) Field of Classification Search
CPC ... G02B 6/0038; G02B 6/0068; G02B 6/0076
See application file for complete search history.

(56) References Cited

U.S. PATENT DOCUMENTS 10,180,229 B2 * 1/2019 Ahn ...................... F21S 43/245

FOREIGN PATENT DOCUMENTS

| JP | 2011-238484 A | 11/2011 | |
| WO | WO-2018056248 A1 * | 3/2018 | ................ F21S 2/00 |

* cited by examiner

*Primary Examiner* — Mary Ellen Bowman
(74) *Attorney, Agent, or Firm* — Xsensus LLP

(57) ABSTRACT

According to one embodiment, a display device includes a display panel, a first light guide, and a second light guide. In the first light guide, a first main surface includes a first plane and first grooves between the first plane and a first side surface, a second main surface includes second grooves orthogonal to the first grooves, and a second plane between the second grooves and the first side surface. In the second light guide, a third main surface includes a third plane and third grooves located between the third plane and a fourth side surface, a fourth main surface includes fourth grooves orthogonal to the third grooves, and a fourth plane located between the fourth grooves and the fourth side surface.

14 Claims, 17 Drawing Sheets

DISPLAY DEVICE

CROSS-REFERENCE TO RELATED APPLICATIONS

This application is based upon and claims the benefit of priority from Japanese Patent Application No. 2021-173221, filed Oct. 22, 2021, the entire contents of which are incorporated herein by reference.

FIELD

Embodiments described herein relate generally to a display device.

BACKGROUND

For example, a display device such as a liquid crystal display device comprises a display panel equipped with pixels and an illumination device that illuminates the display panel. The illumination device comprises a light source that emits light and a light guide to which the light from the light source is applied. The light from the light source is made incident on a side surface of the light guide, propagates the inside of the light guide, and is emitted from an emission surface corresponding to one main surface of the light guide.

For example, a backlight device with two light guides stacked on each other is known. In such a case where two light guides are stacked, if non-uniformity in luminance occurs in the illumination light emitted from the emission surface, the display quality of the image displayed on the display panel may be degraded.

DETAILED DESCRIPTION

Figure 1:
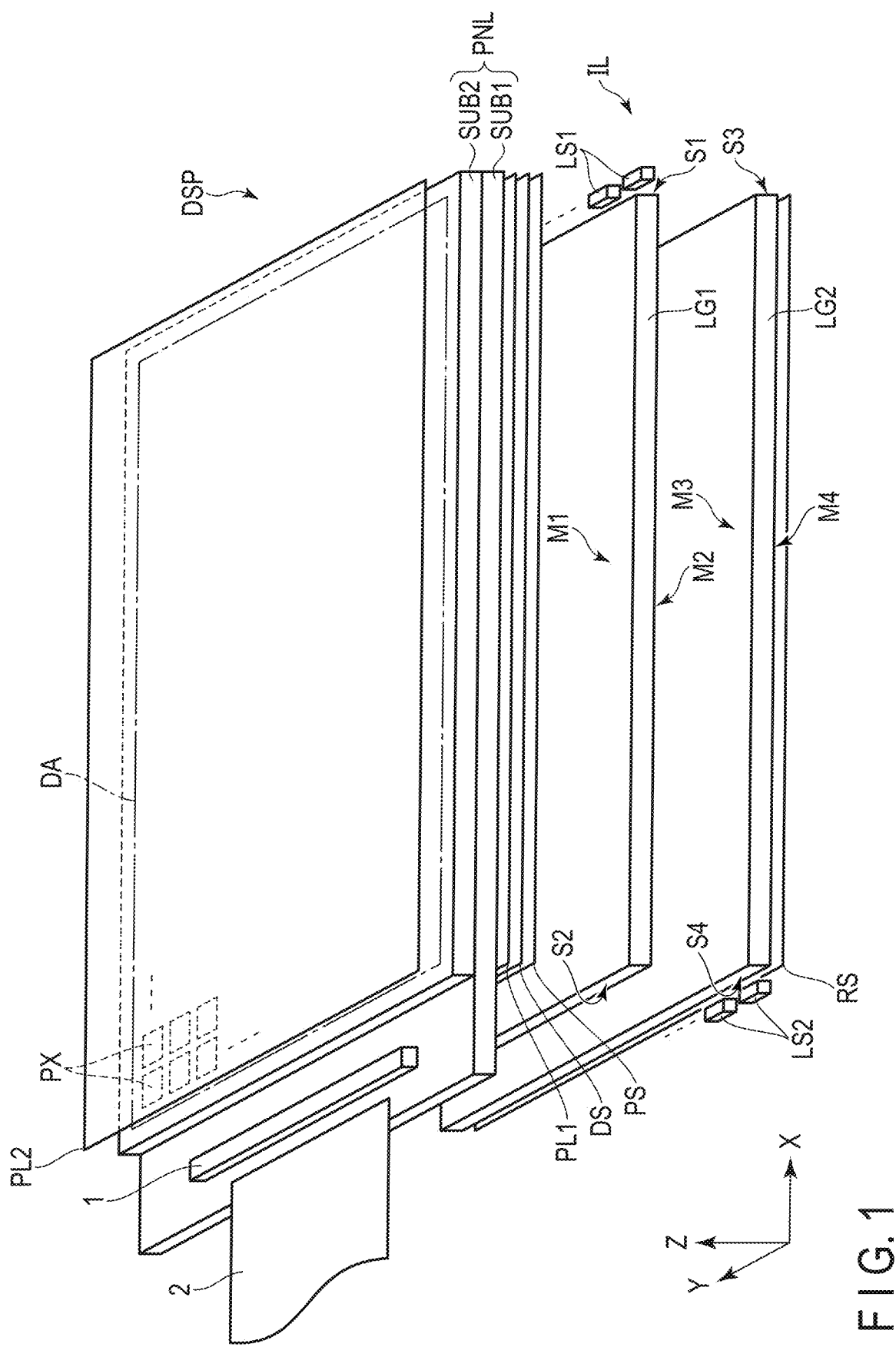
FIG. 1 is an exploded perspective view showing a configuration example of a display device of an embodiment.

In general, according to one embodiment, a display device includes: a display panel configured to display an image; a first light guide having a first main surface opposed to the display panel, a second main surface on a side opposite to the first main surface, a first side surface, and a second side surface on a side opposite to the first side surface; a second light guide having a third main surface opposed to the second main surface, a fourth main surface on a side opposite to the third main surface, a third side surface close to the first side surface, and a fourth side surface located on a side opposite to the third side surface and close to the second side surface; a plurality of first light sources opposed to the first side surface; and a plurality of second light sources opposed to the fourth side surface. The first main surface includes a first plane and a plurality of first grooves located between the first plane and the first side surface. The second main surface includes a plurality of second grooves opposed to the first plane and orthogonal to the first grooves, and a second plane located between the second grooves and the first side surface. The third main surface includes a third plane and a plurality of third grooves located between the third plane and the fourth side surface and parallel to the first grooves. The fourth main surface includes a plurality of fourth grooves opposed to the third plane and orthogonal to the third grooves, and a fourth plane located between the fourth grooves and the fourth side surface.

One of embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some casings, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the structural elements, which have functions identical or similar to the functions described in connection with preceding drawings, are denoted by like reference numbers, and an overlapping detailed description thereof is omitted unless otherwise necessary.

In the embodiment, a transmissive liquid crystal display device is disclosed as an example of a display device DSP. In addition, an illumination device applicable to a backlight device of a transmissive liquid crystal display device is disclosed as an example of an illumination device IL. The main configuration disclosed in the embodiment is applicable to various display devices such as a reflective liquid crystal display device, an electronic paper display device with electrophoretic elements and the like, a display device utilizing micro-electromechanical systems (MEMS), and a display device employing electrochromism. In addition, the main configuration disclosed in the embodiment is also applicable to illumination devices used for applications other than backlight devices.

In the figures, an X-axis, a Y-axis and a Z-axis orthogonal to each other are described to facilitate understanding as needed. A direction along the X-axis is referred to as an X-direction or a first direction, a direction along the Y-axis is referred to as a Y-direction or a second direction, and a direction along the Z-axis is referred to as a Z-direction or a third direction. A plane defined by the X-axis and the Y-axis is referred to as an X-Y plane and viewing the X-Y plane is referred to as planar view. The first direction X and the second direction Y correspond to the directions parallel to a main surface of a substrate constituting the display device DSP or a main surface of the light guide included in the illumination device IL. The third direction Z corresponds to a thickness direction of the display device DSP or a thickness direction of the light guide.

FIG. 1 is an exploded perspective view showing a configuration example of the display device DSP according to the embodiment.

The display device DSP comprises a display panel PNL configured to display images, the illumination substrate IL configured to illuminate the display panel PNL, an IC chip 1, and a wiring board 2.

The display panel PNL is a liquid crystal panel and comprises a first substrate SUB1, a second substrate SUB2, a polarizer PL1, and a polarizer PL2. The first substrate SUB1 and the second substrate SUB2 are opposed to each other in the third direction Z. A liquid crystal layer (not shown) is held between the first substrate SUB1 and the second substrate SUB2. The polarizer PL1 is opposed to the first substrate SUB1 in the third direction Z and is bonded to the first substrate SUB1. The polarizer PL2 is opposed to the second substrate SUB2 in the third direction Z and is bonded to the second substrate SUB2.

The display panel PNL includes a display area DA where images are displayed. The display panel PNL includes, for example, a plurality of pixels PX arrayed in a matrix in the display area DA. The polarizers PL1 and PL2 overlap the display area DA. Polarization axes of the first polarizer PL1 and the second polarizer PL2 are, for example, orthogonal to each other in the X-Y plane.

Each of the IC chip 1 and the wiring board 2 is mounted on the first substrate SUB1. The IC chip 1 may be mounted on the wiring board 2. The wiring board 2 is, for example, a flexible printed circuit board that can be bent. The IC chip 1 and the wiring board 2 function mainly as signal sources that output signals necessary for displaying images to the display panel PNL.

The illumination device IL comprises a first light guide LG1, a second light guide LG2, a plurality of first light sources LS1, a plurality of second light sources LS2, a reflective sheet RS, a prism sheet PS, and a diffusion sheet DS. The reflective sheet RS, the second light guide LG2, the first light guide LG1, the prism sheet PS, and the diffusion sheet DS are arranged in this order in the third direction Z.

The first light guide LG1 and the second light guide LG2 are formed in flat plates along the X-Y plane. For example, the first light guide LG1 and the second light guide LG2 are formed in a rectangular shape having long sides along the first direction X and short sides along the second direction Y, in planar view. Lengths of the long sides of the first light guide LG1 and the second light guide LG2 may be the same or different. In addition, lengths of the short sides of the first light guide LG1 and the second light guide LG2 may be the same or different. In the illustrated example, the lengths of the long sides of the first light guide LG1 and the second light guide LG2 are the same and the lengths of the short sides of the first light guide LG1 and the second light guide LG2 are also the same.

The first light guide LG1 has a first main surface M1, a second main surface M2, a first side surface S1, and a second side surface S2.

The first main surface M1 is opposed to the display panel PNL or the prism sheet PS in the third direction Z. The second main surface M2 is located on a side opposite to the first main surface M1 in the third direction Z. In other words, the first main surface M1 and the second main surface M2 are opposed to each other in the third direction Z.

The first side surface S1 is opposed to the plurality of first light sources LS1 in the first direction X and corresponds to the light-entering surface. The second side surface S2 is located on a side opposite to the first side surface S1 in the first direction X. In other words, the first side surface S1 and the second side surface S2 are opposed to each other in the first direction X. In addition, each of the first side surface S1 and the second side surface S2 is formed along the short sides of the first light guide LG1 to extend in the second direction Y. The first side surface S1 and the second side surface S2 are, for example, planes parallel to the Y-Z plane defined by the second direction Y and the third direction Z.

The plurality of first light sources LS1 are spaced apart and aligned along the second direction Y and are configured to emit light toward the first side surface S1.

The second light guide LG2 has a third main surface M3, a fourth main surface M4, a third side surface S3, and a fourth side surface S4.

The third main surface M3 is opposed to the second main surface M2 in the third direction Z. The fourth main surface M4 is located on a side opposite to the third main surface M3 in the third direction Z. In other words, the third main surface M3 and the fourth main surface M4 are opposed to each other in the third direction Z.

The third side surface S3 is close to the first side surface S1. The fourth side surface S4 is close to the second side surface S2 and is located on a side opposite to the third side surface S3 in the first direction X. In other words, the third side surface S3 and the fourth side surface S4 are opposed to each other in the first direction X. In addition, the fourth side surface S4 is opposed to the plurality of second light sources LS2 in the first direction X and corresponds to a light-entering surface. Each of the third side surface S3 and the fourth side surface S4 is formed along the short sides of the second light guide LG2 to extend in the second direction Y. The third side surface S3 and the fourth side surface S4 are, for example, planes parallel to the Y-Z plane.

The plurality of second light sources LS2 are spaced apart and aligned along the second direction Y and are configured to emit light toward the fourth side surface S4.

The first light sources LS1 and the second light sources LS2 are, for example, laser light sources such as semiconductor lasers that is configured to emit polarized laser light. The first light sources LS1 and the second light sources LS2 are not limited to laser light sources but may be, for example, light emitting diodes.

The first light sources LS1 and the second light sources LS2 may comprise a plurality of light emitting elements that is configured to emit light of different colors. For example, when each of the first light sources LS1 and the second light sources LS2 comprises three light emitting elements that emit red, green, and blue light, the light source can obtain light of a mixture of the colors (for example, white color).

Figure 2:
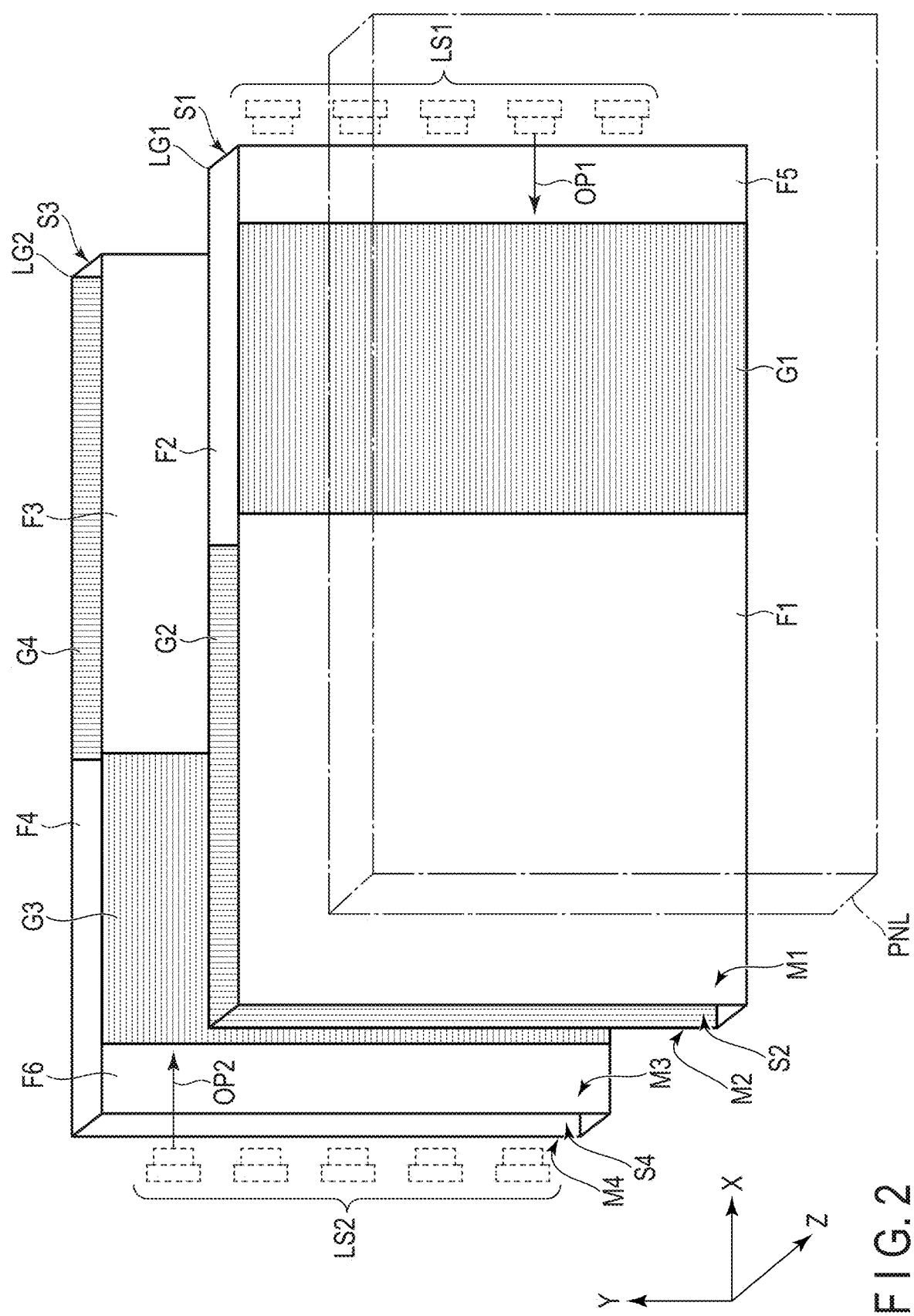
FIG. 2 is a perspective view showing the first light guides LG1 and the second light guides LG2 shown in FIG. 1.

FIG. 2 is a perspective view showing the first light guides LG1 and the second light guides LG2 shown in FIG. 1. In the figure, the first light sources LS1 and the second light sources LS2 are represented by dotted lines, and the display panel PNL is represented by one-dot chain lines.

The first main surface M1 has a first plane F1 intersecting the second side surface S2, a plurality of first grooves G1 located between the first plane F1 and the first side surface S1, and a fifth plane F5 located between the first grooves G1 and the first side surface S1 and intersecting the first side surface S1. The first plane F1 and the fifth plane F5 are flat planes parallel to the X-Y plane. The plurality of first grooves G1 are located between the first plane F1 and the fifth plane F5 in the first direction X. The plurality of first grooves G1 extend in the first direction X and are arranged in the second direction Y.

The second main surface M2 has a plurality of second grooves G2 close to the second side surface S2, and a second plane F2 located between the second grooves G2 and the first side surface S1 and intersecting the first side surface S1. The second plane F2 is a flat plane parallel to the X-Y plane. The plurality of second grooves G2 extend in the second direction Y and are arranged in the first direction X. In other words, each of the second grooves G2 is orthogonal to the first grooves G1 in planar view.

The third main surface M3 includes a third plane F3 intersecting the third side surface S3, a plurality of third grooves G3 located between the third plane F3 and the fourth side surface S4, and a sixth plane F6 located between the third grooves G3 and the fourth side surface S4 and intersecting the fourth side surface S4. The third plane F3 and the sixth plane F6 are flat planes parallel to the X-Y plane. The plurality of third grooves G3 are located between the third plane F3 and the sixth plane F6 in the first direction X. The plurality of third grooves G3 extend in the first direction X and are arranged in the second direction Y. In other words, the direction of extension of the third grooves G3 is parallel to the direction of extension of the first grooves G1.

The fourth main surface M4 has a plurality of fourth grooves G4 close to the third side surface S3, and a fourth plane F4 located between the fourth grooves G4 and the fourth side surface S4 and intersecting the fourth side surface S4. The fourth plane F4 is a flat plane parallel to the X-Y plane. The plurality of fourth grooves G4 extend in the second direction Y and are arranged in the first direction X. In other words, each of the fourth grooves G4 is orthogonal to the third grooves G3 in planar view.

An optical path OP1 of a principal ray with the highest intensity, of the light emitted from the first light sources LS1, is parallel to the first direction X in planar view. In other words, on the first light guide LG1, the direction of extension of each of the first grooves G1 is parallel to the optical path OP1, and the direction of extension of each of the second grooves G2 is perpendicular to the optical path OP1.

An optical path OP2 of a principal ray with the highest intensity, of the light emitted from the second light sources LS2, is parallel to the first direction X in planar view. In other words, on the second light guide LG2, the direction of extension of each of the third grooves G3 is parallel to the optical path OP2, and the direction of extension of each of the fourth grooves G4 is orthogonal to the optical path OP2.

Figure 3:
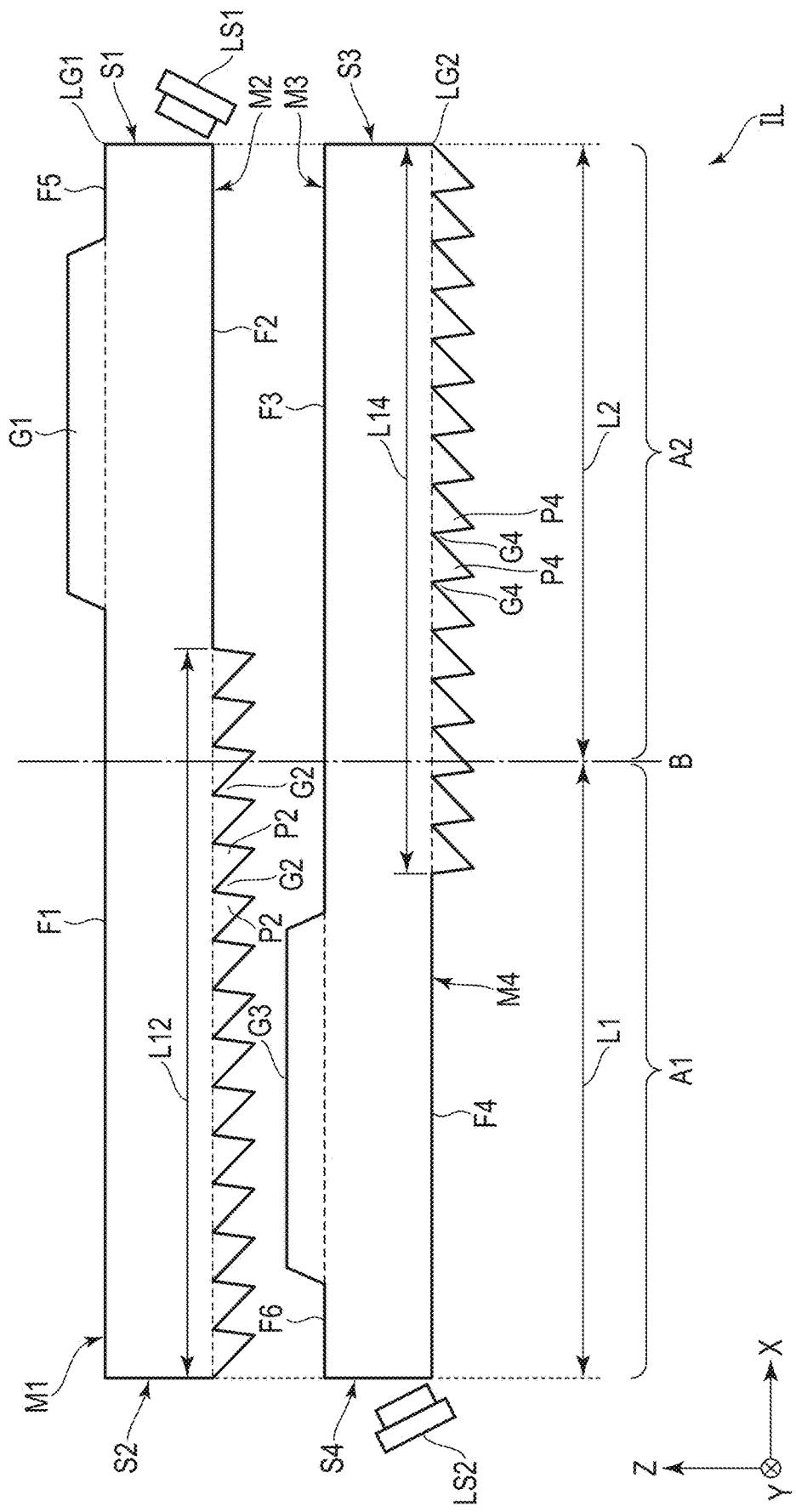
FIG. 3 is a cross-sectional view showing the illumination device IL shown in FIG. 1.

FIG. 3 is a cross-sectional view showing the illumination device IL shown in FIG. 1. A cross-sectional view of the first light guide LG1 and the second light guide LG2 along the X-Z plane defined by the first direction X and the third direction Z is shown in FIG. 3.

The illumination device IL includes a first area A1 and a second area A2 that are arranged in the first direction X. A case where the first light guide LG1 and the second light guide LG2 have the same length along the first direction X, the first side surface S1 is located directly above the third side surface S3, and the second side surface S2 is located directly above the fourth side surface S4 will be described.

A length L1 of the first area A1 along the first direction X is equal to a length L2 of the second area A2 along the first direction X. A boundary B between the first area A1 and the second area A2 is located at a middle point between the first side surface S1 and the second side surface S2, and is also located at a middle point between the third side surface S3 and the fourth side surface S4.

On the first light guide LG1, the second grooves G2 are formed in the first area A1 from the second side surface S2 to the boundary B and are also formed in the second area A2. In other words, the length L12 along the first direction X of the area where the second grooves G2 are formed is longer than the length L1 of the first area A1.

The second groove G2 is formed between two protruding portions P2 adjacent to each other in the first direction X. In other words, a plurality of second grooves G2 are formed by a plurality of protruding portions P2. Each of the protruding portions P2 is a prism extending in the second direction Y and has a triangular cross-sectional shape.

The first plane F1 is located in the first area A1 and is opposed to the second grooves G2 in the third direction Z. Such a first plane F1 corresponds to an emission surface on which the light propagating inside the first light guide LG1 is emitted to the outside.

The second plane F2 and the fifth plane F5 are located in the second area A2. The fifth plane F5 is opposed to the second plane F2 in the third direction Z. In the example illustrated, the first grooves G1 are located in the second area A2 and opposed to the second plane F2. At least part of the first grooves G1 may be opposed to the second grooves G2.

On the second light guide LG2, the fourth grooves G4 are formed in the second area A2 from the third side surface S3 to the boundary B and are also formed in the first area A1. In other words, a length L14 along the first direction X of the area where the fourth grooves G4 are formed is longer than the length L2 of the second area A2.

The fourth groove G4 is formed between two protruding portions P4 adjacent to each other in the first direction X. In other words, the plurality of fourth grooves G4 are formed by the plurality of protruding portions P4. Each of the protruding portions P4 is a prism extending in the second direction Y and has a triangular cross-sectional shape.

The third plane F3 is located in the second area A2 and opposed to the fourth grooves G4 in the third direction Z. Such a third plane F3 corresponds to an emission surface on which the light propagating inside the second light guide LG2 is emitted to the outside.

The fourth plane F4 and the sixth plane F6 are located in the first area A1. The sixth plane F6 is opposed to the fourth plane F4 in the third direction Z. In the example illustrated, the third grooves G3 are located in the first area A1 and opposed to the fourth plane F4. At least part of the third grooves G3 may be opposed to the fourth grooves G4.

Figure 4A:
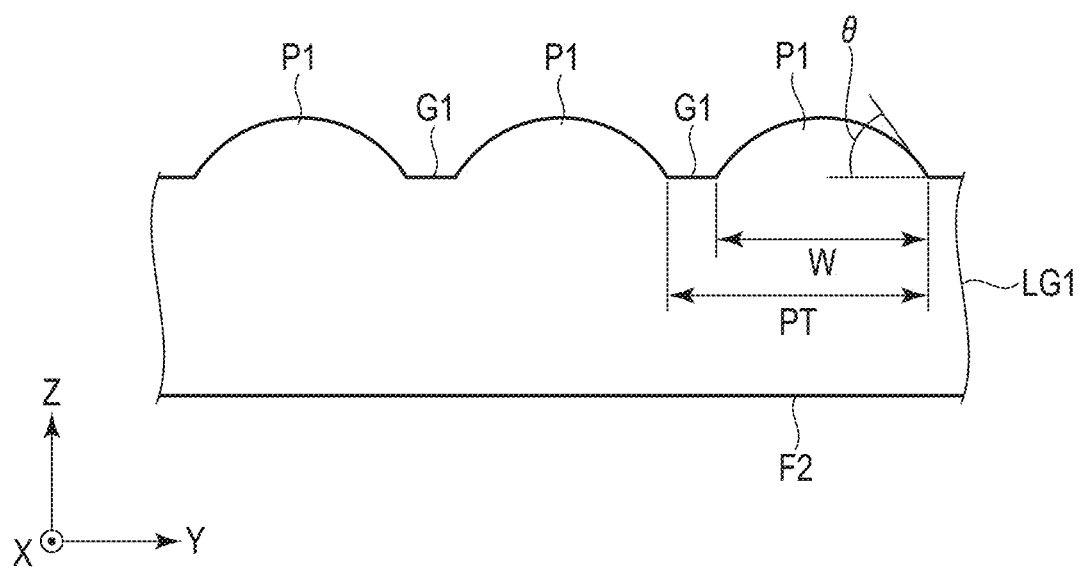
FIG. 4A is a cross-sectional view showing an example of the first light guide LG1 shown in FIG. 2.

FIG. 4A is a cross-sectional view showing the first light guide LG1 shown in FIG. 2. A cross-sectional view of the first light guide LG1 including the first grooves G1 along the Y-Z plane defined by the second direction Y and the third direction Z is shown in FIG. 4A.

The first groove G1 is formed between two protruding portions P1 adjacent to each other in the second direction Y.

In other words, the plurality of first grooves G1 are formed by the plurality of protruding portions P1. Each of the protruding portions P1 extends in the first direction X and has a curved surface. The curved surface is a cylindrical surface, but the cross-section is not limited to an arc.

The protruding portion P1 has a width W in the second direction Y. In addition, the adjacent protruding portion P1 is arranged at a pitch PT. For example, the width W is substantially equal to the pitch PT.

When the angle formed between a tangent of the protruding portion P1 and the X-Y plane is defined as a contact angle θ of the protruding portion P1, the contact angle θ is, for example, in a range from 2° to 10°.

Figure 4B:
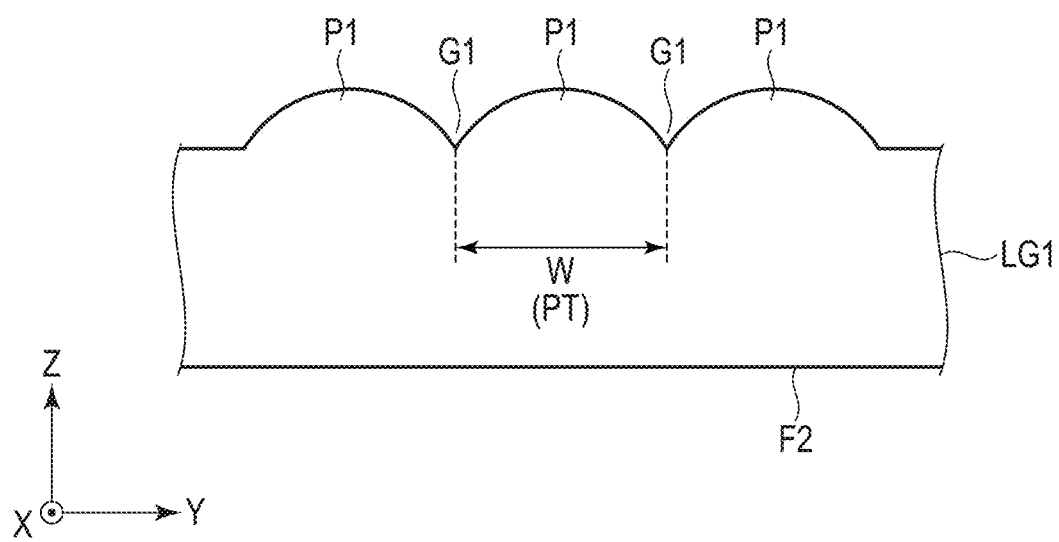
FIG. 4B is a cross-sectional view showing another example of the first light guide LG1 shown in FIG. 2.

The first groove G1 has been described with reference to FIG. 4A, but the third groove G3 is also formed in the same manner as the first groove G1 and its illustration and detailed explanation are omitted. In the example shown in FIG. 4A, the first groove G1 has a plane parallel to the second plane F2 but may not have the parallel plane. In other words, as shown in FIG. 4B, adjacent protruding portions P1 may be continuously formed.

Figure 5:
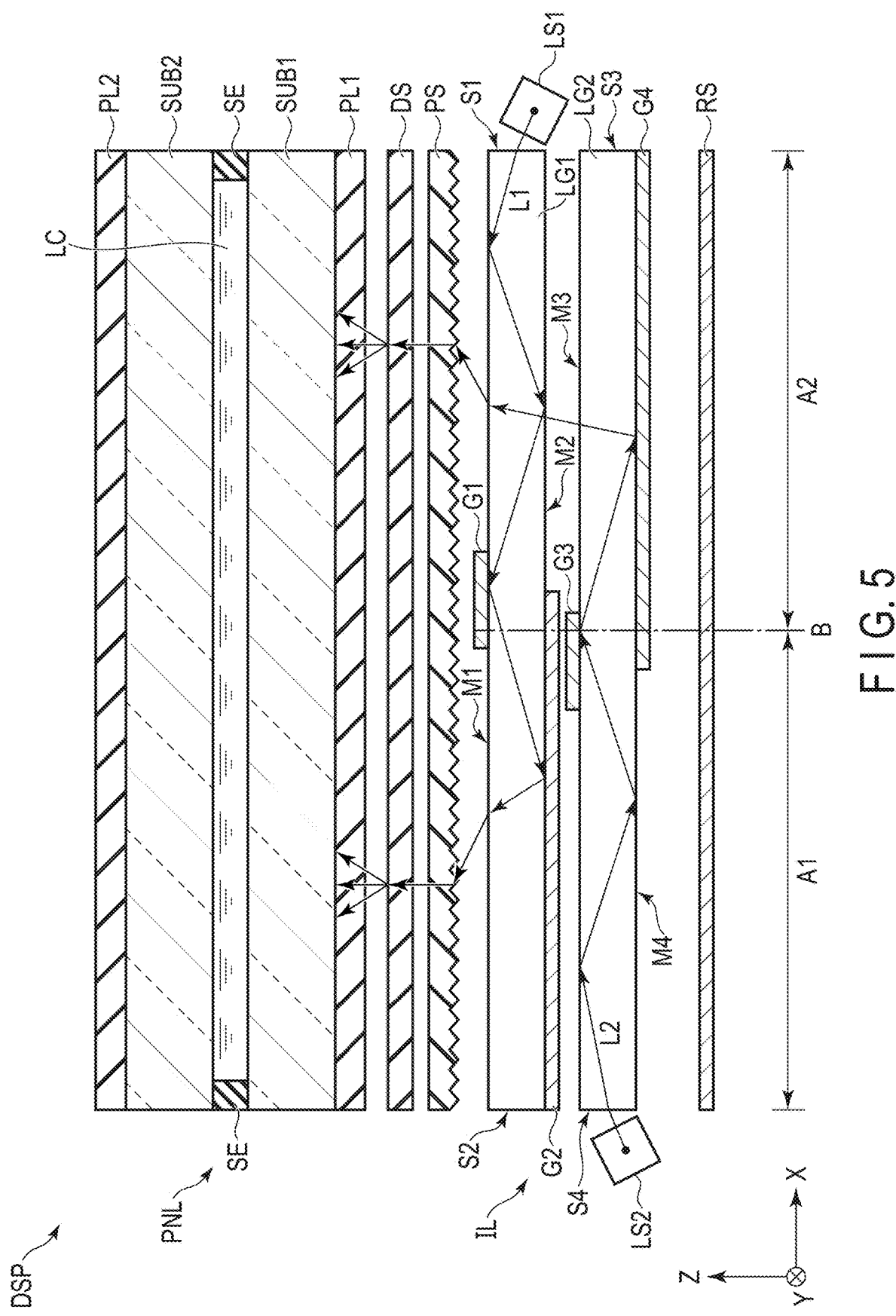
FIG. 5 is a cross-sectional view showing the display device DSP shown in FIG. 1.

FIG. 5 is a cross-sectional view showing the display device DSP shown in FIG. 1.

In the display panel PNL, the liquid crystal layer LC and the sealant SE are located between the first substrate SUB1 and the second substrate SUB2. The sealant SE bonds the first substrate SUB1 and the second substrate SUB2 and seals the liquid crystal layer LC between the first substrate SUB1 and the second substrate SUB2.

In the illumination device IL, the reflective sheet RS comprises a function of reflecting the light that leaks from the second light guide LG2 toward the second light guide LG2. The prism sheet PS comprises a function of collecting light emitted from the first main surface M1 of the first light guide LG1. A plurality of prism sheets PS may be arranged between the first light guide LG1 and the diffusion sheet DS. The diffusion sheet DS comprises a function of diffusing the light made incident on the diffusion sheet DS to uniform the luminance of the light.

The light L1 emitted from the first light source LS1 is refracted on the first side surface S1 and is made incident on the first light guide LG1. The light L1 made incident on the first light guide LG1 travels toward the first main surface M1 and is reflected at an interface between the first light guide LG1 and an air layer. The reflected light L1 travels toward the second main surface M2 and is reflected at the interface between the first light guide LG1 and the air layer. Thus, in the second area A2, the light L1 travels through the inside of the first light guide LG1 while being repeatedly reflected on the first main surface M1 and the second main surface M2. In addition, the light L1 traveling toward the first groove G1 is diffused moderately in a direction orthogonal to the direction of travel of the light L1 when reflected by the protruding portion P1 of the first groove G1.

The light L1 traveling toward the second groove G2, of the light L1 traveling inside the first light guide LG1 toward the first area A1 is reflected by the protruding portion (prism) P2 of the second groove G2 and is emitted from the first main surface M1 without meeting the total reflection conditions of the first main surface M1. The light mainly emitted from the first main surface M1 of the first area A1 illuminates the display panel PNL through the prism sheet PS and the diffusion sheet DS.

Similarly, the light L2 emitted from the second light source LS2 is refracted on the fourth side surface S4 and is made incident on the second light guide LG2. In the first area A1, the light L2 travels through the inside of the second light guide LG2 while being repeatedly reflected on the third main surface M3 and the fourth main surface M4. In addition, the light L2 traveling toward the third grooves G3 is diffused moderately in a direction orthogonal to the direction of travel of the light L2 when reflected by the protruding portion of the third grooves G3. Furthermore, the light L2 traveling toward the fourth grooves G4, of the light L2 traveling inside the second light guide LG2 toward the second area A2 is reflected by the protruding portion (prism) of the fourth grooves G4 and is emitted from the third main surface M3 without meeting the total reflection conditions of the third main surface M3. The light mainly emitted from the third main surface M3 in the second area A2 illuminates the display panel PNL through the prism sheet PS and the diffusion sheet DS.

In general, the light from a plurality of light sources arranged and spaced apart at intervals travels inside the light guide while diffusing, but these light beams are not sufficiently mixed in the vicinity of the light sources. For this reason, in a display device using such light as the illumination light, there is a risk that linear non-uniformity in luminance caused by differences in luminance may be visibly recognized when the display area is viewed in planar view. In particular, laser light has high luminance, but is highly directional and has a small diffusivity in the direction orthogonal to the direction of travel of laser light.

According to the embodiment, in the first light guide LG1, the light L1 is diffused in a direction orthogonal to the direction of travel since the first groove G1 extending in the direction of travel of the light L1 is provided. For this reason, the light L1 that has reached the first area A1 mixes with each other and can produce illumination light with suppressed non-uniformity in luminance.

Similarly, in the second light guide LG2, the light L2 is diffused in a direction orthogonal to the direction of travel since the third grooves G3 extending in the direction of travel of the light L2 is provided. For this reason, the light L2 that has reached the second area A2 mixes with each other and can produce illumination light with suppressed non-uniformity in luminance.

Therefore, degradation in display quality caused by the non-uniformity in luminance of the illumination light can be suppressed.

Figure 6:
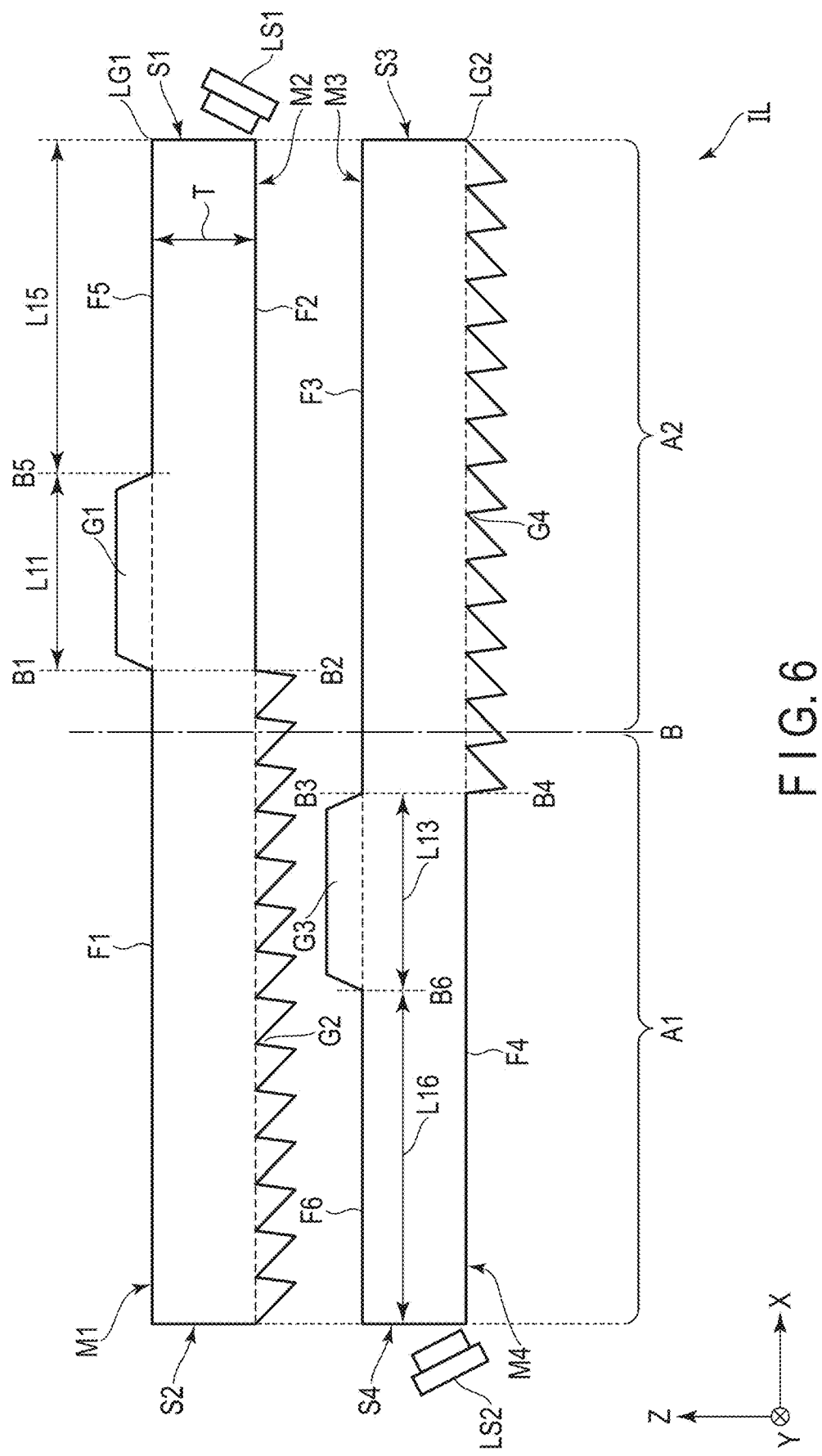
FIG. 6 is a cross-sectional view showing Example 1 of the illumination device IL shown in FIG. 1.

FIG. 6 is a cross-sectional view showing Example 1 of the illumination device IL shown in FIG. 1.

First, the first light guide LG1 will be described.

The first groove G1, the fifth plane F5, and the second plane F2 are located in the second area A2. The first groove G1 and the fifth plane F5 are opposed to the second plane F2 in the third direction Z. The first plane F1 and the second groove G2 are located in the first area A1 and are also located in a part of the second area A2 beyond the boundary B. The first plane F1 is opposed to the second groove G2 in the third direction Z.

The first groove G1 is not opposed to the second groove G2 in the third direction Z. In addition, in the example shown in FIG. 6, almost no gap exists between the first groove G1 and the second groove G2 in planar view. In other words, the first plane F1 and the second plane F2 are not opposed to each other in the third direction Z. In other words, a boundary B1 between the first groove G1 and the first plane F1 overlaps a boundary B2 between the second groove G2 and the second plane F2. A boundary B5 between the first groove G1 and the fifth plane F5 overlaps the second plane F2.

In addition, the length L11 of the first groove G1 along the first direction X is smaller than the length L15 of the fifth plane F5 along the first direction X. For example, in the first light guide LG1 in which a diagonal length in planar view is 127 mm (equivalent to 5 inches), the length L11 is 6.4 mm and the length L15 is 37 mm. When the length along the third direction Z between the second plane F2 and the fifth plane F5 is referred to as a thickness T of the first light guide LG1, the thickness T is 1 mm. A contact angle θ of the protruding portion P1 that forms the first groove G1 is 5.6°.

Next, the second light guide LG2 will be described. The second light guide LG2 has the same shape as the first light guide LG1. In other words, the first light guide LG1 and the second light guide LG2 have a cross-sectional shape that has line symmetry about the boundary B in the cross-sectional view of the X-Z plane.

The third groove G3, the sixth plane F6, and the fourth plane F4 are located in the first area A1. The third groove G3 and the sixth plane F6 are opposed to the fourth plane F4 in the third direction Z. The third plane F3 and the fourth grooves G4 are located in the second area A2 and are also located in a part of the first area A1 beyond the boundary B. The third plane F3 is opposed to the fourth grooves G4 in the third direction Z.

The third groove G3 is not opposed to the fourth groove G4 in the third direction Z. In addition, in the example shown in FIG. 6, almost no gap exists between the third grooves G3 and the fourth grooves G4 in planar view. In other words, the third plane F3 and the fourth plane F4 are not opposed to each other in the third direction Z. In other words, a boundary B3 between the third groove G3 and the third plane F3 overlaps a boundary B4 between the fourth groove G4 and the fourth plane F4. A boundary B6 between the third grooves G3 and the sixth plane F6 overlaps the fourth plane F4.

In addition, the length L13 of the third groove G3 along the first direction X is smaller than the length L16 of the sixth plane F6 along the first direction X.

In Example 2 and Example 3 described below, the illumination device IL in which at least part of the plurality of first grooves G1 are opposed to the plurality of second grooves G2 and at least part of the plurality of third grooves G3 are opposed to the plurality of fourth grooves G4 will be described.

Figure 7:
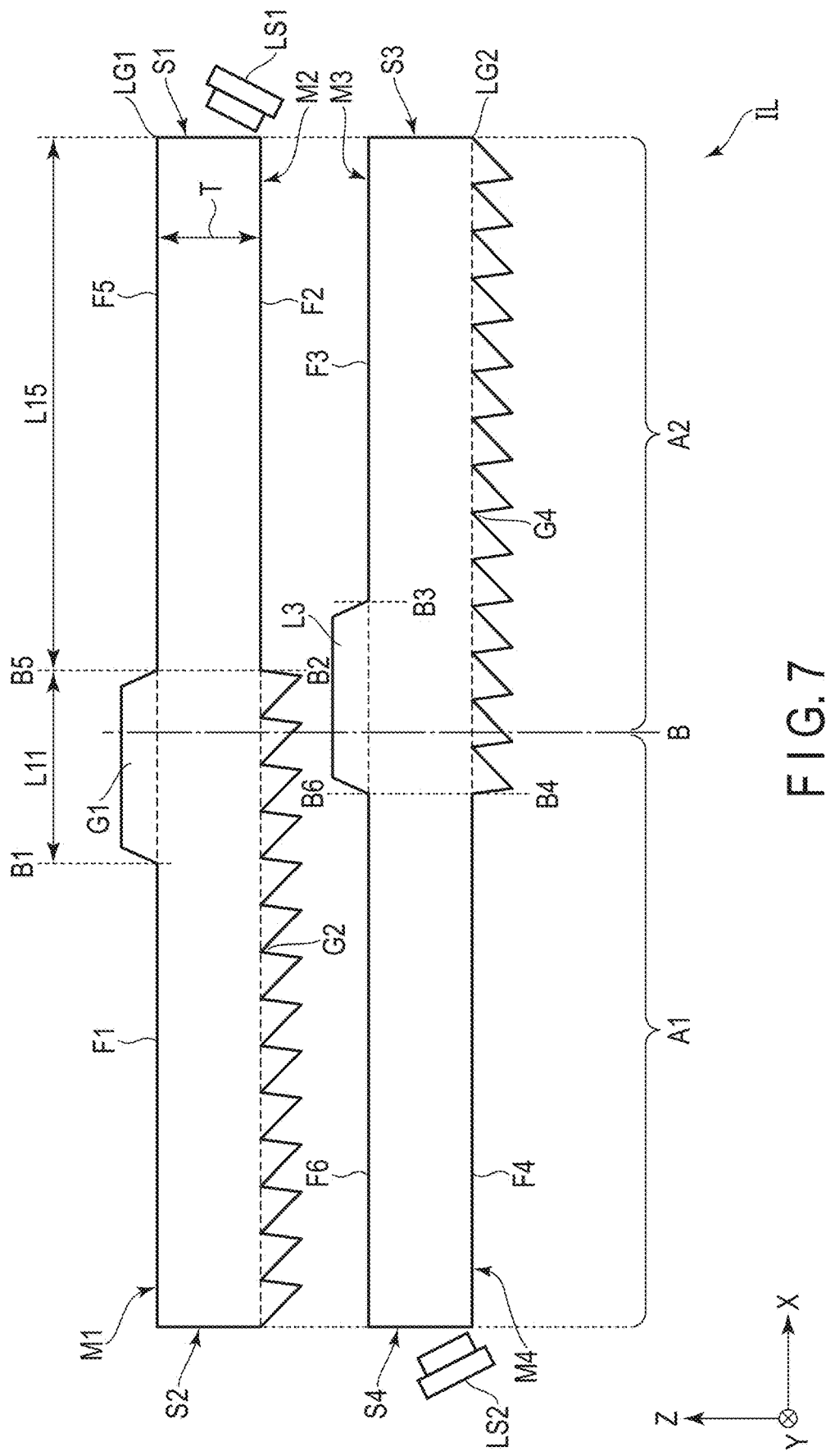
FIG. 7 is a cross-sectional view showing Example 2 of the illumination device IL shown in FIG. 1.

FIG. 7 is a cross-sectional view showing Example 2 of the illumination device IL shown in FIG. 1.

In the first light guide LG1, the fifth plane F5 located between the first groove G1 and the first side surface S1 is opposed to the second plane F2 in the third direction Z. The fifth plane F5 and the second plane F2 are located in the second area A2. The first plane F1 and the first groove G1 are opposed to the second groove G2 in the third direction Z. The first groove G1 is not opposed to the second plane F2. In addition, the fifth plane F5 is not opposed to the second groove G2. In other words, the boundary B5 between the first groove G1 and the fifth plane F5 overlaps the boundary B2 between the second groove G2 and the second plane F2.

In addition, the length L11 of the first groove G1 along the first direction X is smaller than the length L15 of the fifth plane F5 along the first direction X. For example, in the first light guide LG1 in which a diagonal length in planar view is 127 mm (equivalent to 5 inches), the length L11 is 6.4 mm and the length L15 is 44 mm.

In the second light guide LG2, the sixth plane F6 located between the third grooves G3 and the fourth side surface S4 is opposed to the fourth plane F4 in the third direction Z. The sixth plane F6 and the fourth plane F4 are located in the first area A1. The third plane F3 and the third grooves G3 are opposed to the fourth grooves G4 in the third direction Z. The third grooves G3 is not opposed to the fourth plane F4. In addition, the sixth plane F6 is not opposed to the fourth grooves G4. In other words, the boundary B6 between the third groove G3 and the sixth plane F6 overlaps the boundary B4 between the fourth groove G4 and the fourth plane F4.

In addition, the length L13 of the third groove G3 along the first direction X is smaller than the length L16 of the sixth plane F6 along the first direction X.

Figure 8:
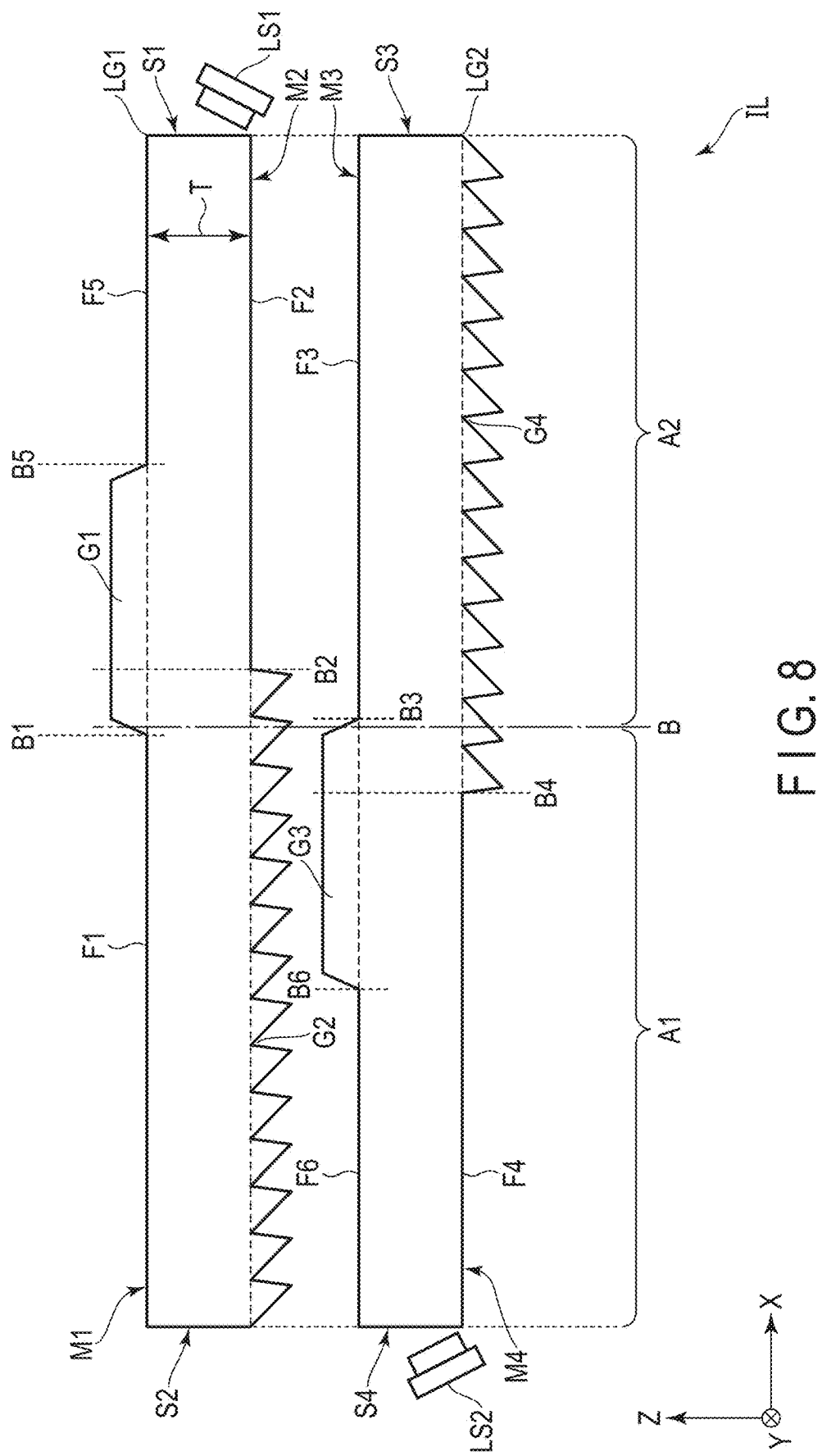
FIG. 8 is a cross-sectional view showing Example 3 of the illumination device IL shown in FIG. 1.

FIG. 8 is a cross-sectional view showing Example 3 of the illumination device IL shown in FIG. 1.

In the first light guide LG1, the first plane F1 and the first groove G1 are opposed to the second groove G2 in the third direction Z. In addition, the first groove G1 and the fifth plane F5 are opposed to the second plane F2 in the third direction Z. The first plane F1 is not opposed to the second plane F2. In addition, the fifth plane F5 is not opposed to the second groove G2. The boundary B5 between the first groove G1 and the fifth plane F5 is opposed to the second plane F2 in the third direction Z. In addition, the boundary B2 between the second groove G2 and the second plane F2 is opposed to the first groove G1 in the third direction Z.

In the second light guide LG2, the third plane F3 and the third grooves G3 are opposed to the fourth grooves G4 in the third direction Z. In addition, the third groove G3 and the sixth plane F6 are opposed to the fourth plane F4 in the third direction Z. The third plane F3 is not opposed to the fourth plane F4. In addition, the sixth plane F6 is not opposed to the fourth grooves G4. The boundary B6 between the third groove G3 and the sixth plane F6 is opposed to the fourth plane F4 in the third direction Z. In addition, the boundary B4 between the fourth groove G4 and the fourth plane F4 is opposed to the third groove G3 in the third direction Z.

Next, the inventors evaluated the first light guide LG1 with different specifications of the first groove G1. Results of evaluation will be described below.

Figure 9A:
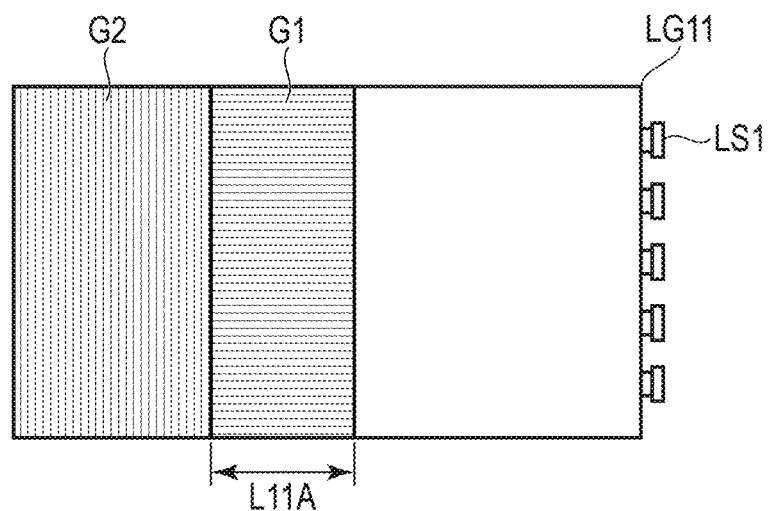
FIG. 9A is a view illustrating Evaluation Result 1.
Figure 9B:
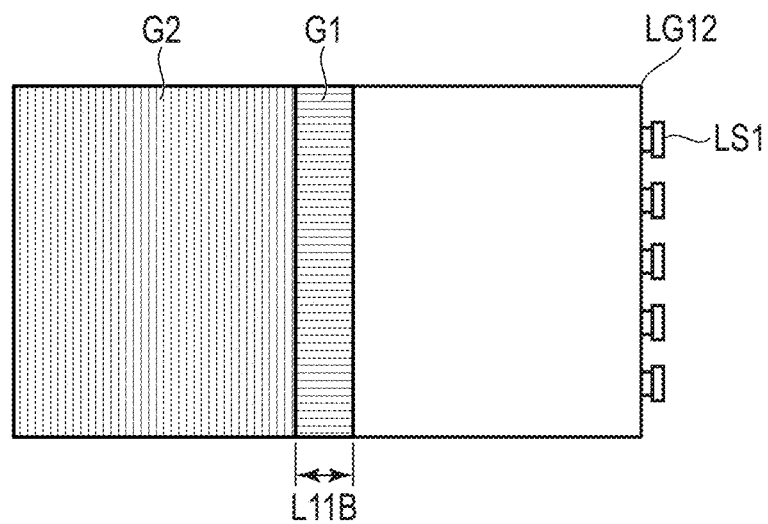
FIG. 9B is a view illustrating Evaluation Result 1.

FIG. 9A and FIG. 9B are views illustrating Evaluation Result 1.

In the first light guide LG11 shown in FIG. 9A, the first grooves G1 have a length L11A along the first direction X. In the first light guide LG12 shown in FIG. 9B, the first grooves G1 have a length L11B along the first direction X. The length L11A is greater than the length L11B.

Comparison in optical characteristics between the illumination devices IL to which the first light guides LG11 and LG12 were respectively applied indicated an evaluation result that the obtained effect was different depending on the length of the first grooves G1. In other words, the longer the first grooves G1 are, the more effective the improvement of the non-uniformity in luminance is. In contrast, the shorter the first grooves G1 are, the higher the luminance of the illumination light is. In addition, the polarization degree of the light emitted from the first light sources LS1 is higher as the first grooves G1 are shorter.

Figure 10A:
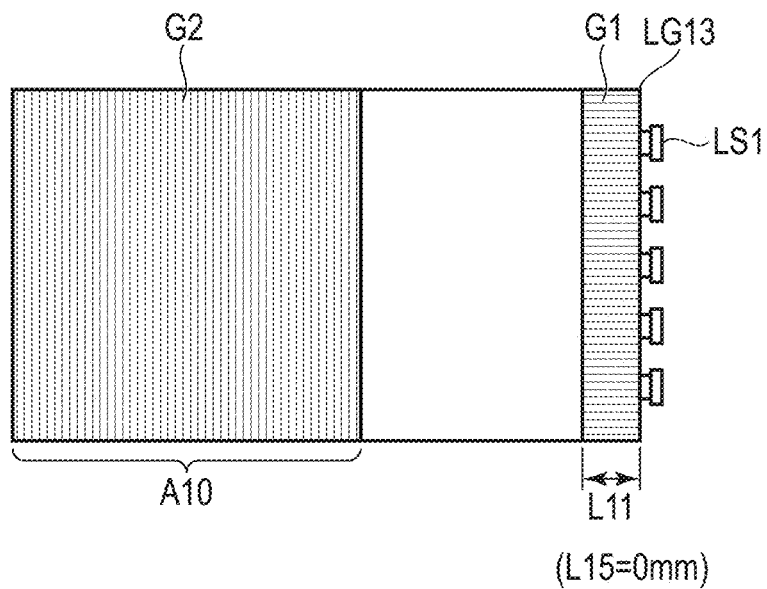
FIG. 10A is a view illustrating Evaluation Result 2.
Figure 10B:
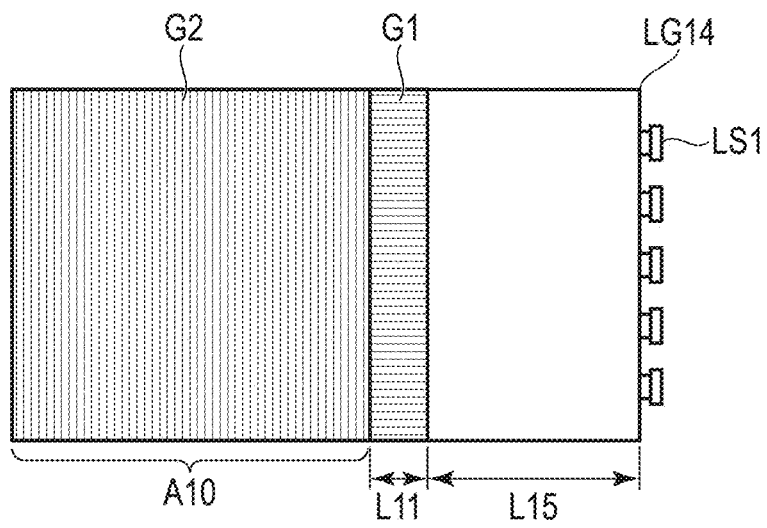
FIG. 10B is a view illustrating Evaluation Result 2.

FIG. 10A and FIG. 10B are views illustrating Evaluation Result 2.

In a first light guide LG13 shown in FIG. 10A, the first grooves G1 are close to the first light source LS1 and are separated from the second grooves G2 (L15=0 mm). In a first light guide LG14 shown in FIG. 10B, the first grooves G1 are separated from the first light sources LS1 and are close to the second grooves G2. In all the first grooves G1, the length L11 along the first direction X is equal.

Comparison in optical characteristics between the illumination devices IL to which the first light guides LG13 and LG14 were applied respectively indicates an evaluation result that the effect of improvement of the non-uniformity in luminance was different depending on the position of formation of the first grooves G1. In other words, the non-uniformity in luminance was visually recognized in the area A10 overlapping the second grooves G2, in the first light guide LG13, while the non-uniformity in luminance was hardly recognized in the area A10 overlapping the second grooves G2, in the first light guide LG14. In other words, the first grooves G1 are desirably separated from the first light sources LS1, based on the viewpoint of improving the non-uniformity in luminance.

Figure 11A:
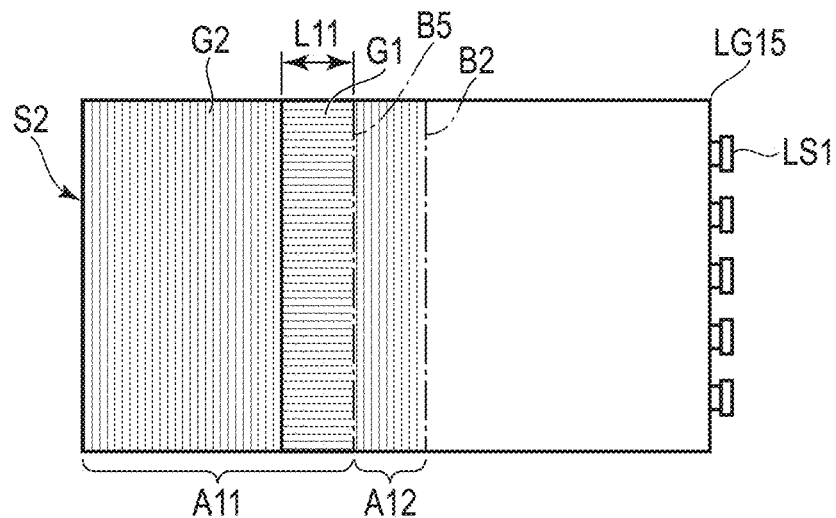
FIG. 11A is a view illustrating Evaluation Result 3.
Figure 11B:
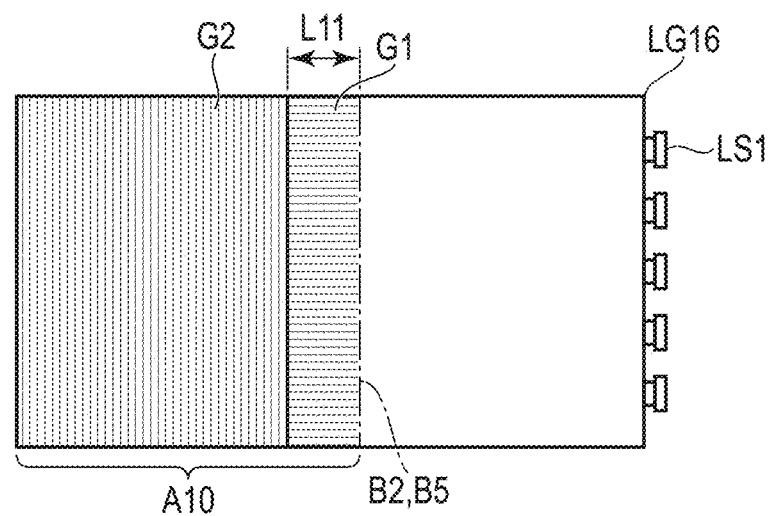
FIG. 11B is a view illustrating Evaluation Result 3.
Figure 11C:
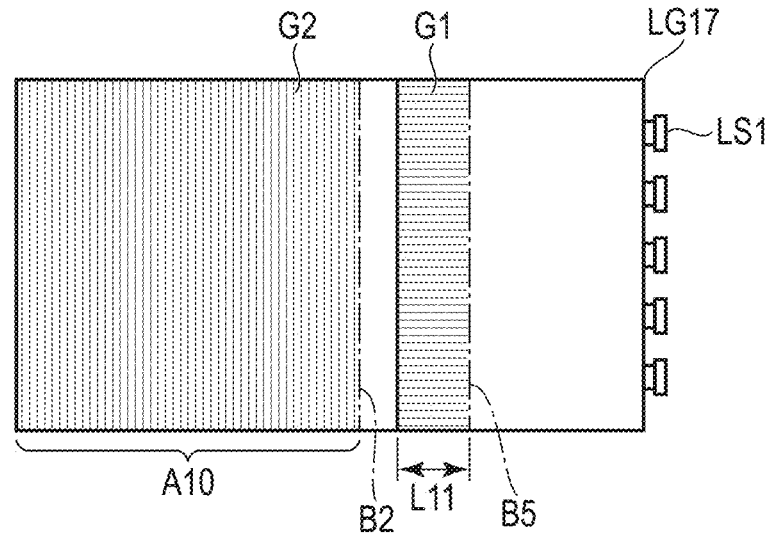
FIG. 11C is a view illustrating Evaluation Result 3.

FIG. 11A, FIG. 11B and FIG. 11C are views illustrating Evaluation Result 3.

In a first light guide LG15 shown in FIG. 11A, the first grooves G1 are opposed to the second grooves G2, and the boundary B2 is located between the boundary B5 and the first light sources LS1. In a first light guide LG16 shown in FIG. 11B, the first grooves G1 are opposed to the second grooves G2, and the boundary B2 overlaps the boundary B5. In a first light guide LG17 shown in FIG. 11C, the first grooves G1 are not opposed to the second grooves G2, and the boundary B5 is located between the boundary B2 and the first light sources LS1. In all the first grooves G1, the length L11 along the first direction X is equal.

Comparison in optical characteristics between the illumination devices IL to which the first light guides LG15 to LG17 were applied respectively indicates an evaluation result that the effect of improvement of the non-uniformity in luminance was different depending on the position of formation of the first grooves G1. In other words, in the first light guide LG15, the non-uniformity in luminance was hardly recognized visibly in the area A11 from the boundary B5 to the second side surface S2, of the area overlapping the second grooves G2, and the non-uniformity in luminance was visibly recognized in the area A12 between the boundary B2 and the boundary B5, of the area overlapping the second grooves G2. In the first light guides LG16 and LG17, the non-uniformity in luminance was hardly recognized visibly in the area A10 overlapping the second grooves G2. In other words, desirably, the boundary B5 overlaps the boundary B2 or is closer to the first light sources LS1 than the boundary B2, based on the viewpoint of improving the non-uniformity in luminance.

Figure 12A:
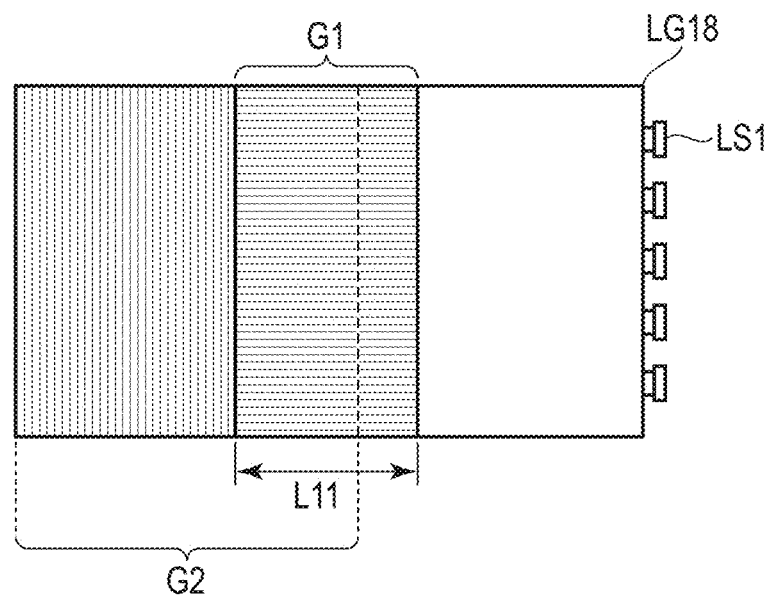
FIG. 12A is a view illustrating Evaluation Result 4.
Figure 12B:
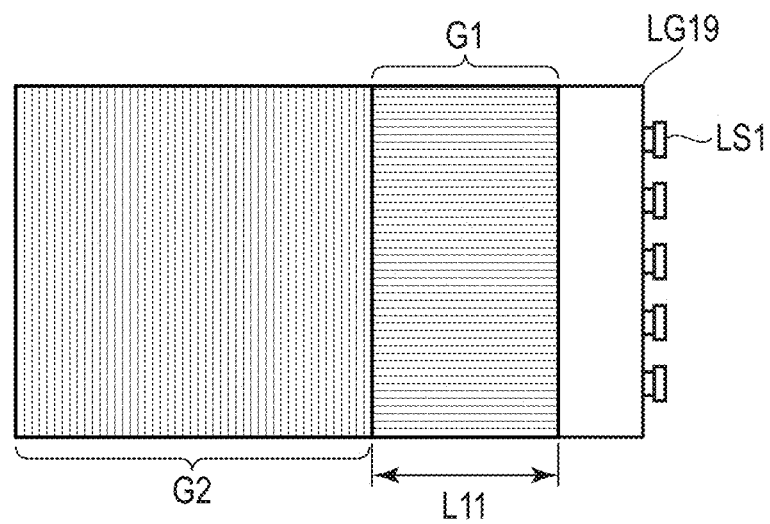
FIG. 12B is a view illustrating Evaluation Result 4.

FIG. 12A and FIG. 12B are views illustrating Evaluation Result 4.

In a first light guide LG18 shown in FIG. 12A, a part of the first grooves G1 are opposed to the second grooves G2. In a first light guide LG19 shown in FIG. 12B, the first grooves G1 are not opposed to the second grooves G2. In all the first grooves G1, the length L11 along the first direction X is equal.

Comparison in optical characteristics between the illumination devices IL to which the first light guides LG18 and LG19 were applied respectively indicates an evaluation result that the polarization degree was different depending on the position of formation of the first grooves G1. In other words, decrease in polarization degree of the light emitted from the first light sources LS1 was remarkable in the first light guide LG18, and the polarization degree of the light emitted from the first light sources LS1 was substantially maintained in the first light guide LG19. In other words, desirably, a section where the first grooves G1 and the second grooves G2 are opposed to each other is not provided, based on the viewpoint of suppressing the decrease in polarization degree.

Figure 13A:
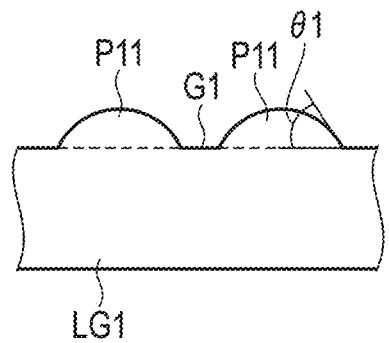
FIG. 13A is a view illustrating Evaluation Result 5.
Figure 13B:
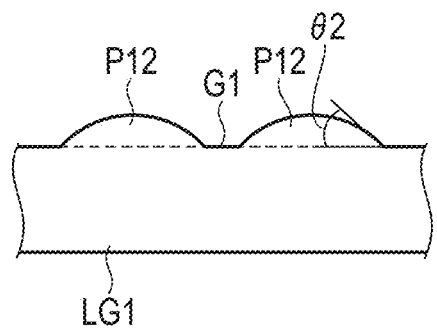
FIG. 13B is a view illustrating Evaluation Result 5.

FIG. 13A and FIG. 13B are views illustrating Evaluation Result 5.

In the first light guide LG1 shown in FIG. 13A, protruding portions P11 forming the first groove G1 has a contact angle θ1. In the first light guide LG1 shown in FIG. 13B, protruding portions P12 forming the first groove G1 has a contact angle θ2. The contact angle θ1 is larger than the contact angle θ2.

Comparison in optical characteristics between the illumination devices IL to which the first light guides LG1 were respectively applied indicated an evaluation result that the obtained effect was different depending on the magnitude of the contact angle. In other words, the larger the contact angle, the higher the improvement effect of the non-uniformity in luminance. In contrast, the decrease in polarization degree of the light emitted from the first light sources LS1 is suppressed as the contact angle is smaller.

The first light guide LG1 has been described in Evaluation Results 1 to 5 described above, but it goes without saying that the same evaluation results as those for the first light guide LG1 can also be obtained for the second light guide LG2.

Figure 14:
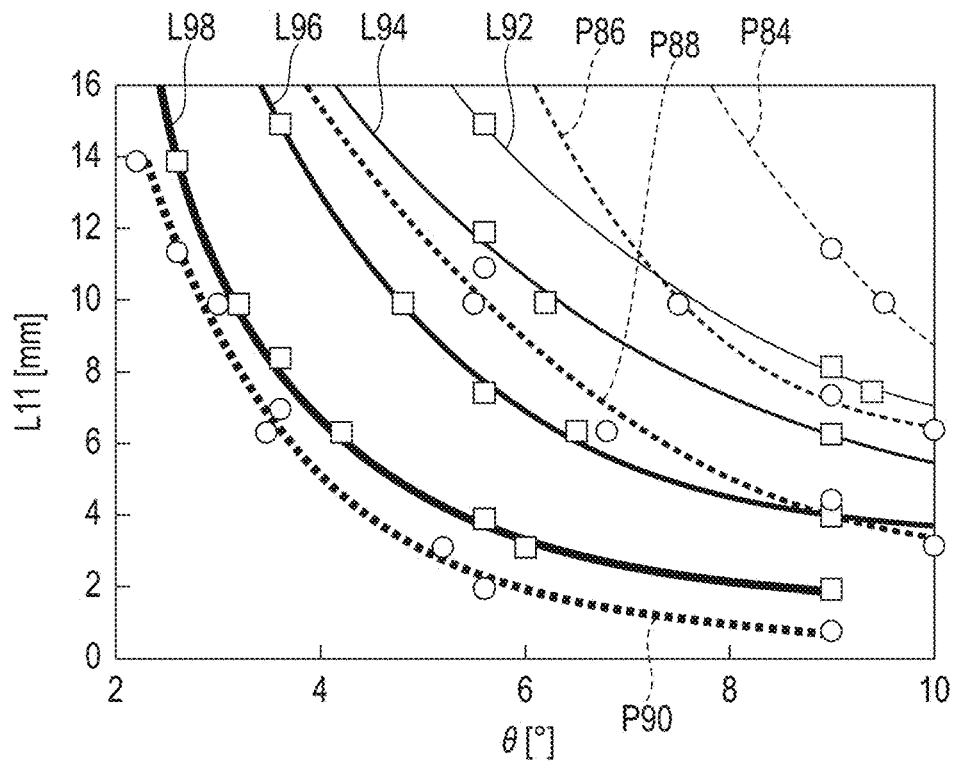
FIG. 14 is a graph showing a relationship between the contact angle θ of the protruding portions forming the first groove G1 and the length L11 of the first groove G1.

FIG. 14 is a graph showing a relationship between the contact angle θ of the protruding portions forming the first groove G1 and the length L11 of the first groove G1.

In the graph, the horizontal axis indicates the contact angle θ (°), and the vertical axis indicates the length L11 (mm).

The conditions under which the luminance ratio is the same and the polarization degree is the same in the illumination devices different in contact angle θ and length L11, are connected by lines, respectively. The luminance ratio is a relative value in a case where the luminance of the light emitted from the illumination device under the condition where the first groove G1 is not provided is set to 100. The polarization degree indicates polarization degree of the linearly polarized light emitted from the illumination device.

In the graph, L98, L96, L94, and L92 indicate that the luminance ratios are 98%, 96%, 94%, and 92%, respectively. In the graph, P90, P88, P86, and P84 indicate that the polarization degrees are 90%, 88%, 86%, and 84%, respectively.

It was confirmed from the relationships shown in the graph that as the contact angle θ is smaller and as the length L11 is shorter, a higher luminance ratio can be obtained and higher polarization degree can be obtained.

Figure 15:
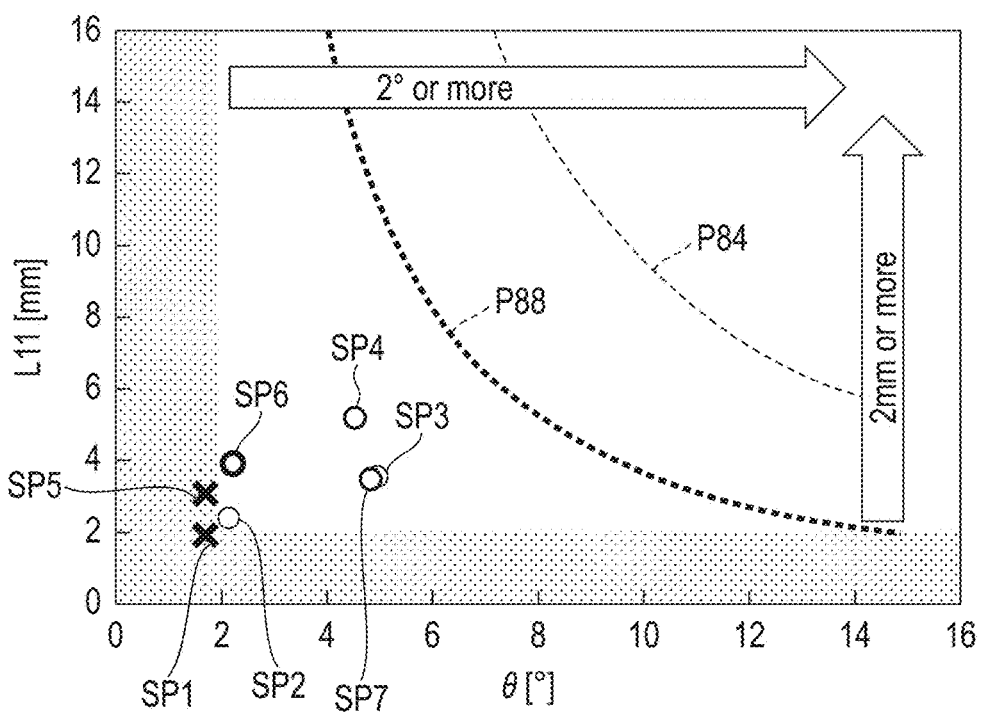
FIG. 15 is a graph illustrating a relationship between the value of the contact angle θ and the value of the length L11.

FIG. 15 is a graph illustrating a relationship between the value of the contact angle θ and the value of the length L11.

In the graph, the horizontal axis indicates the contact angle θ (°), and the vertical axis indicates the length L11 (mm).

Presence or absence of the non-uniformity in luminance on seven samples was confirmed. A thickness T of each light guide was 1.0 mm, and the angle of incidence α of the light from the light source to the light guide was 26.5°.

Sample SP1 had the contact angle θ of 1.7° and the length L11 of 1.9 mm.

Sample SP2 had the contact angle θ of 2.1° and the length L11 of 2.3 mm.

Sample SP3 had a contact angle θ of 5.0° and a length L11 of 3.5 mm.

Sample SP4 had the contact angle θ of 4.5° and the length L11 of 5.2 mm.

Sample SP5 had a contact angle θ of 1.7° and a length L11 of 3.0 mm.

Sample SP6 had the contact angle θ of 2.2° and the length L11 of 3.9 mm.

Sample SP7 had the contact angle θ of 4.8° and the length L11 of 3.5 mm.

FIG. 15 also shows a line connected under the condition that the polarization degree is 88% and a line connected under the condition that the polarization degree is 84%, as shown in FIG. 14. This is an excerpt from FIG. 14 since the polarization degree is desirably at least 84% or more, more desirably 88% or more, based on the viewpoint of suppressing the degradation in display quality. As shown in FIG. 15, the polarization degree of all samples SP1 to SP7 was 88% or more, and there is no problem on the polarization degree. In contrast, non-uniformity in luminance was visibly recognized in the emitted light from the illumination device for samples SP1 and SP5. For the other samples, no non-uniformity in luminance was visually recognized. In other words, it was confirmed that a higher luminance ration and a higher polarization degree can be obtained as values of the contact angle θ and length L11 are smaller and that the non-uniformity in luminance cannot be suppressed when the values of contact angle θ and length L11 are too small. It was confirmed from these results that, desirably, based on the viewpoint of suppressing the non-uniformity in luminance, the contact angle θ should be set with reference to 2° and the length L11 should be set with reference to 2 mm, in consideration of the relationship between the thickness T of the light guide and the angle of incidence α, which will be described later.

The values of contact angle θ and length L11 described here are not applied only to the protruding portions forming the first groove G1, but also to protruding portions forming a third groove G3 and a length L13 of the third groove G3.

Figure 16:
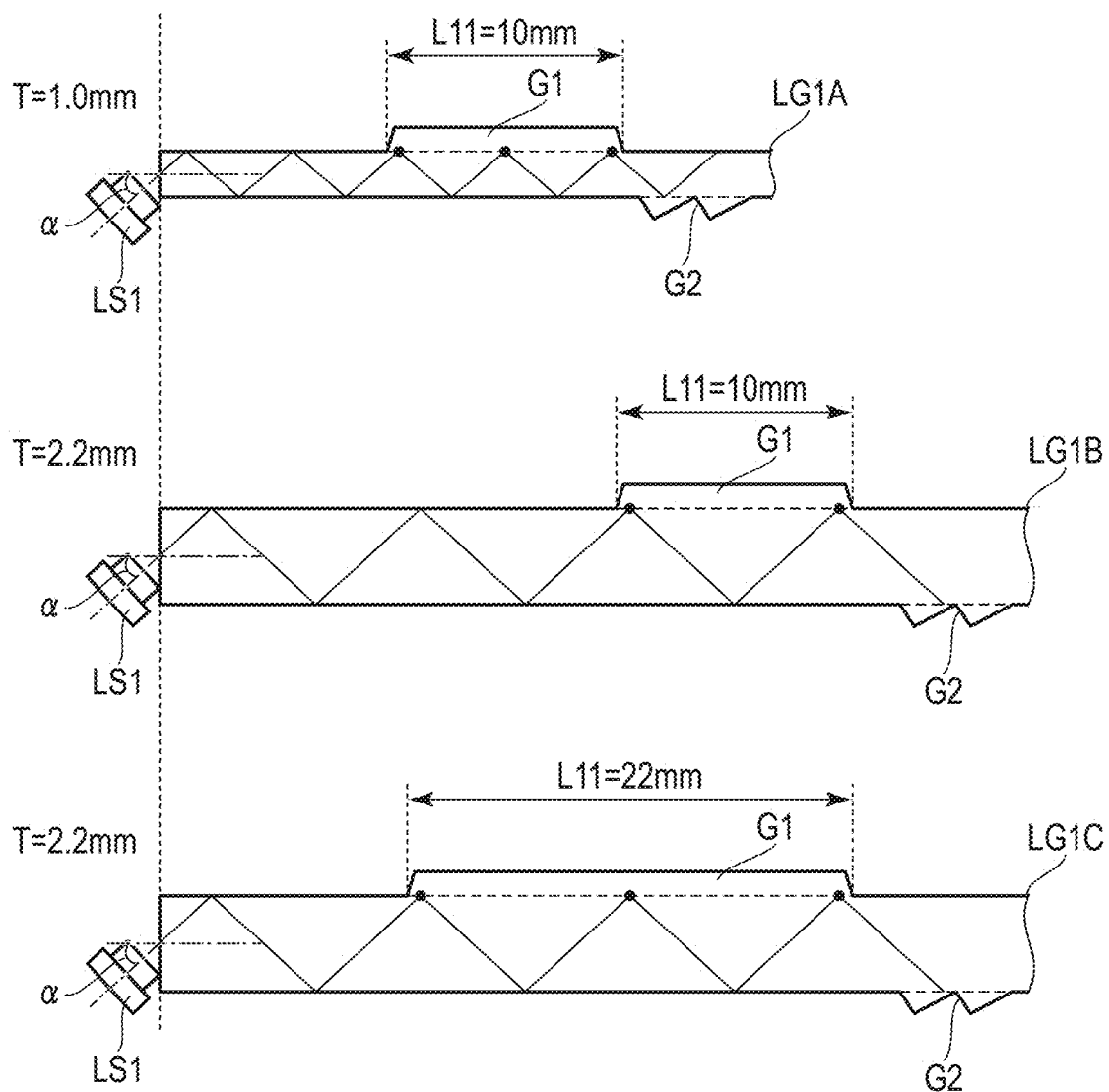
FIG. 16 is a view illustrating a relationship between a thickness T of the first light guide LG1 and a length L11 of the first groove G1.

FIG. 16 is a view illustrating a relationship between a thickness T of the first light guide LG1 and a length L11 of the first groove G1.

An upper stage of FIG. 16 shows a first light guide LG1A having a thickness T of 1.0 mm and a length L11 of 10 mm.

A middle stage of FIG. 16 shows a first light guide LG1B having a thickness T of 2.2 mm and a length L11 of 10 mm.

A lower stage of FIG. 16 shows a first light guide LG1C having a thickness T of 2.2 mm and a length L11 of 22 mm.

The angle of incidence α of the light from the first light sources LS1 is 26.5° for any of the first light guides.

In the first light guide LG1A of the upper stage, it is shown that the light traveling inside is reflected three times in the first groove G1.

In the first light guide LG1B of the middle stage, the length L11 is the same as that of the first light guide LG1A, but the thickness T is 2.2 times that of the first light guide LG1A. In the first light guide LG1B, the light traveling inside is reflected twice in the first groove G1. In such a first light guide LG1B, since the number of reflections in the first groove G1 is smaller than that in the first light guide LG1A, the degree of diffusion at the first groove G1 is reduced and the non-uniformity in luminance can be recognized more easily than that in the first light guide LG1A.

In the first light guide LG1C of the lower stage, the length L11 is 2.2 times that of the first light guide LG1A, and the thickness T is 2.2 times that of the first light guide LG1A. In the first light guide LG1C, the light traveling inside is reflected three times in the first groove G1. In other words, in such a first light guide LG1C, since the number of reflections in the first groove G1 is larger than that in the first light guide LG1B, the non-uniformity in luminance can be recognized more hardly than that in the first light guide LG1B.

In short, when the angle of incidence α of the light to the first light guide LG1 is constant, the length L11 needs be increased as the thickness T is increased, based on the viewpoint of suppressing the non-uniformity in luminance.

Figure 17:
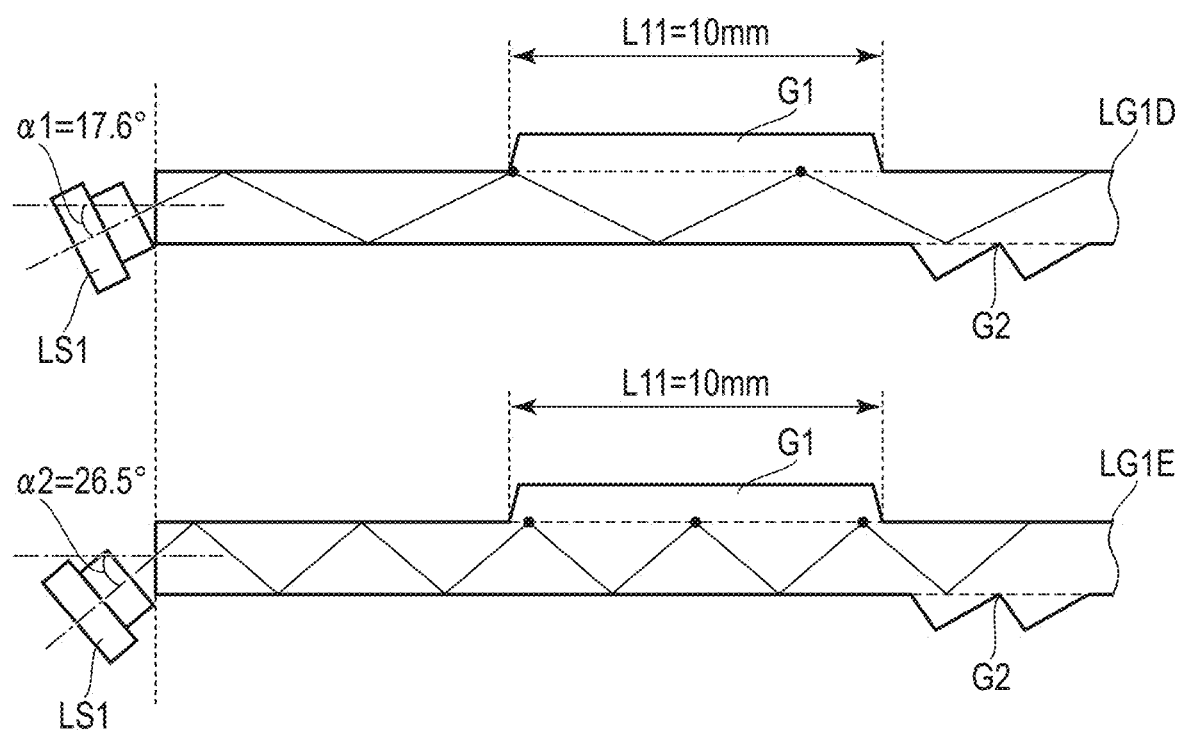
FIG. 17 is a view illustrating a relationship between the angle of incidence α and the length L11 of the first groove G1.

FIG. 17 is a view illustrating a relationship between the angle of incidence α and the length L11 of the first groove G1.

An upper stage of FIG. 17 shows a first light guide LG1D having an angle of incidence α1 of 17.6° and the length L11 of 10 mm.

A lower stage of FIG. 17 shows a first light guide LG1E having an angle of incidence α2 of 26.5° and the length L11 of 10 mm.

The thickness T is 1.0 mm in both the first light guides.

In a first light guide LG1E of the lower stage, it is shown that the light traveling inside is reflected three times in the first groove G1.

In a first light guide LG1D of the upper stage, the length L11 is the same as that of the first light guide LG1E, but the angle of incidence α1 is smaller than the angle of incidence α2. In the first light guide LG1D, the light traveling inside is reflected twice in the first groove G1. In such a first light guide LG1D, since the number of reflections in the first groove G1 is smaller than that in the first light guide LG1E, the degree of diffusion in the first groove G1 is reduced and the non-uniformity in luminance can be recognized more easily than that in the first light guide LG1E.

In short, when the thickness T of the first light guide LG1 is made constant, the length L11 needs to be increased as the angle of incidence α is smaller, from the viewpoint of suppressing the non-uniformity in luminance.

The angle of incidence α commonly set in FIG. 16 is the angle at which light can be made incident on the light guide LG with the least loss. In addition, the thickness T commonly set in FIG. 17 is the thickness of the most common light guide.

It was confirmed from the results shown in FIG. 16 and FIG. 17 that the optimal values of the contact angle θ and the length L11 to suppress the non-uniformity in luminance are different depending on the thickness T of the light guide LG and the angle of incidence α of the light on the light guide LG.

Thus, when a length L11 is referred to as a referential length Lo, the contact angle θ is referred to as a reference contact angle θo, the angle of incidence to be applied is referred to as δ, and the thickness of the light guide to be applied is referred to as d, in a case where the thickness T of the light guide LG is 1.0 mm and the angle of incidence α of the light on the light guide LG is 26.5°, the optimal value of the length L11 can be obtained from the following equation (1).

$$L11 = \frac{\tan 26.5°}{\tan \delta} L_0 d \quad (1)$$

In addition, the optimal value of the contact angle θ can be obtained from the following equation (2).

$$\theta = \frac{\arcsin\left(\sin 2\theta_0 \frac{\tan 26.5°}{\tan \delta}\right)}{2} \quad (2)$$

When the referential length Lo and the referential contact angle θo shown here are set to be Lo≥2 mm and θo≥2° based on the results shown in FIG. 15, the non-uniformity in luminance can be suppressed.

Figure 18:
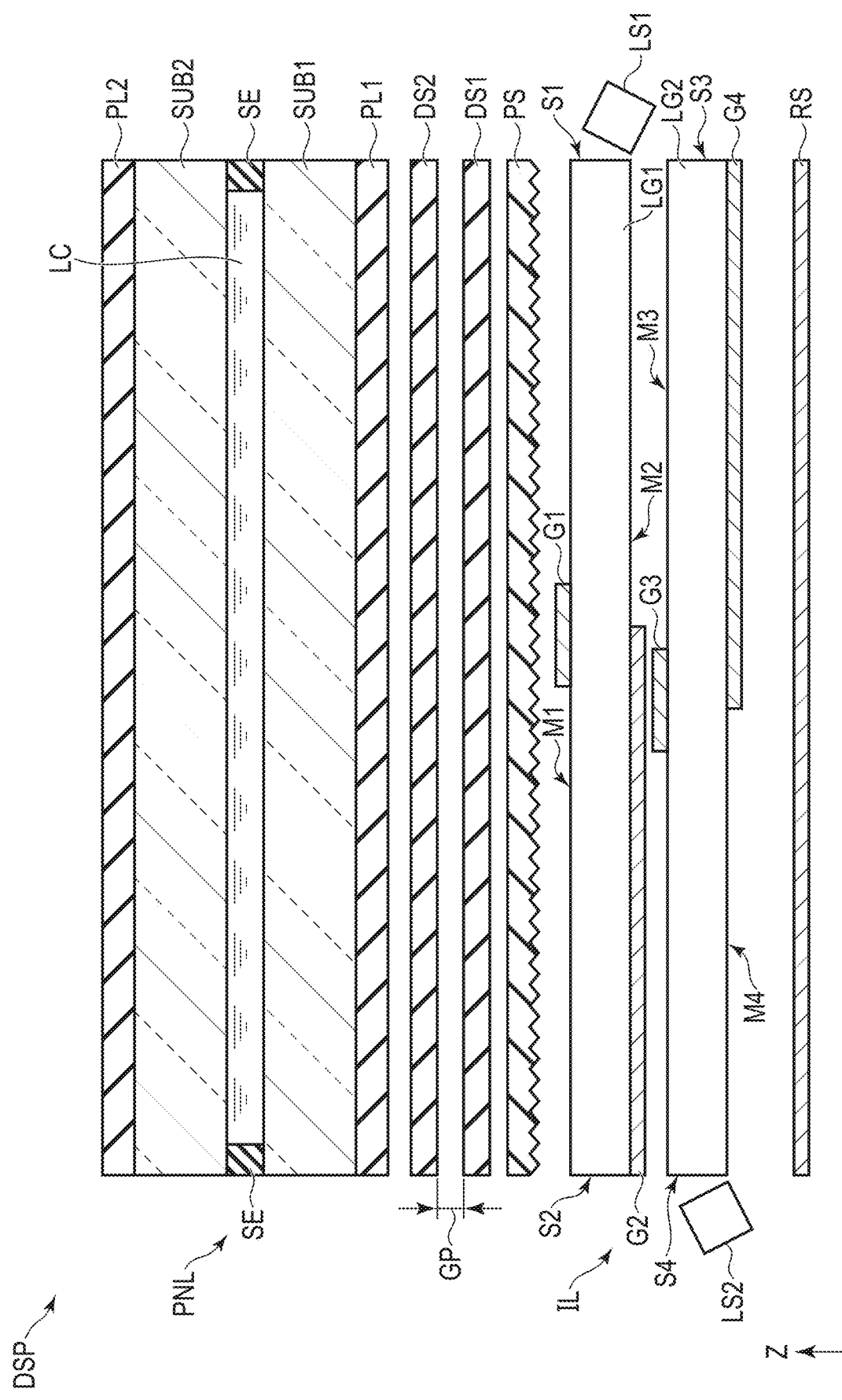
FIG. 18 is a cross-sectional view showing a modified example of the embodiment.

FIG. 18 is a cross-sectional view showing a modified example of the embodiment.

The modified example shown in FIG. 18 is different from the example shown in FIG. 5 in that that illumination device IL comprises two diffusion sheets DS1 and DS2. In other words, the diffusion sheet DS1 is located between the prism sheet PS and the diffusion sheet DS2, and the diffusion sheet DS2 is located between the diffusion sheet DS1 and the polarizer PL1. An interval between the diffusion sheets DS1 and DS2 along the third direction Z is 1 mm or more and, more desirably, 2 mm or more.

In such a modified example, the effect of improving the non-uniformity in luminance, which is equal to or more than that described above, can be obtained.

It was confirmed in the above embodiment that when the luminance distribution is compared in a case where the first plane F1 which is the emission surface is a mirror surface and a case where the first plane F1 is a rough surface, for example, in the first light guide LG1, the effect of improving the non-uniformity in luminance in a case where the first plane F1 is a rough surface is higher. For this reason, the first plane F1 is desirably a rough surface in the first light guide LG1. In contrast, the second plane F2 desirably has a high reflectivity for the light L1 traveling in the second area A2 and is desirably a mirror surface. For this reason, in the first light guide LG1, the surface roughness of the first plane F1 is desirably larger than the surface roughness of the second plane F2.

Similarly, in the second light guide LG2, the surface roughness of the third plane F3 is desirably larger than the surface roughness of the fourth plane F4.

As described above, according to the embodiments, a display device DSP capable of suppressing deterioration in display quality can be provided.

All of the illumination devices and display devices that can be implemented by a person of ordinary skill in the art through arbitrary design changes to the illumination devices and display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a display panel configured to display an image;
a first light guide having a first main surface opposed to the display panel, a second main surface on a side opposite to the first main surface, a first side surface, and a second side surface on a side opposite to the first side surface;
a second light guide having a third main surface opposed to the second main surface, a fourth main surface on a side opposite to the third main surface, a third side surface close to the first side surface, and a fourth side surface located on a side opposite to the third side surface and close to the second side surface;
a plurality of first light sources opposed to the first side surface; and
a plurality of second light sources opposed to the fourth side surface, wherein
the first main surface includes a first plane and a plurality of first grooves located between the first plane and the first side surface,
the second main surface includes a plurality of second grooves opposed to the first plane and orthogonal to the first grooves, and a second plane located between the second grooves and the first side surface,
the third main surface includes a third plane and a plurality of third grooves located between the third plane and the fourth side surface and parallel to the first grooves, and
the fourth main surface includes a plurality of fourth grooves opposed to the third plane and orthogonal to the third grooves, and a fourth plane located between the fourth grooves and the fourth side surface.

2. The display device of claim 1, wherein
the first side surface and the second side surface are opposed to each other in a first direction, and
the plurality of first grooves extend in the first direction and are arranged in a second direction orthogonal to the first direction.

3. The display device of claim 1, wherein
the plurality of first grooves are opposed to the second plane and are not opposed to the plurality of second grooves, and
the plurality of third grooves are opposed to the fourth plane and are not opposed to the plurality of fourth grooves.

4. The display device of claim 3, wherein
a boundary between the first plane and one of the first grooves overlaps a boundary between the second plane and one of the second grooves, and
a boundary between the third plane and one of the third grooves overlaps a boundary between the fourth plane and one of the fourth grooves.

5. The display device of claim 3, wherein
the first main surface includes a fifth plane located between the plurality of first grooves and the first side surface and opposed to the second plane, and
the third main surface includes a sixth plane located between the plurality of third grooves and the fourth side surface and opposed to the fourth plane.

6. The display device of claim 5, wherein
the plurality of first grooves and the plurality of third grooves extend in a first direction,
a length of the first grooves along the first direction is smaller than a length of the fifth plane along the first direction, and
a length of the third grooves along the first direction is smaller than a length of the sixth plane along the first direction.

7. The display device of claim 1, wherein
at least part of the plurality of first grooves are opposed to the plurality of second grooves, and
at least part of the plurality of third grooves are opposed to the plurality of fourth grooves.

8. The display device of claim 7, wherein
the first main surface includes a fifth plane located between the plurality of first grooves and the first side surface and opposed to the second plane, and the third main surface includes a sixth plane located between the plurality of third grooves and the fourth side surface and opposed to the fourth plane.

9. The display device of claim 8, wherein
a boundary between the fifth plane and one of the first grooves overlaps a boundary between the second plane and one of the second grooves, and
a boundary between the sixth plane and one of the third grooves overlaps a boundary between the fourth plane and one of the fourth grooves.

10. The display device of claim 8, wherein
a boundary between the fifth plane and one of the first grooves is opposed to the second plane, and
a boundary between the sixth plane and one of the third grooves is opposed to the fourth plane.

11. The display device of claim 8, wherein
the plurality of first grooves and the plurality of third grooves extend in a first direction,
a length of the first grooves along the first direction is smaller than a length of the fifth plane along the first direction, and
a length of the third grooves along the first direction is smaller than a length of the sixth plane along the first direction.

12. The display device of claim 1, wherein
each of the first grooves and the third grooves is formed between two adjacent protruding portions, and
the protruding portions have curved surfaces.

13. The display device of claim 1, wherein
the plurality of first light sources and the plurality of second light sources are laser sources.

14. The display device of claim 12, wherein
a length of the first grooves along a first direction is formed according to the following equation (1)

$$L11 = \frac{\tan 26.5°}{\tan \delta} L_0 d \qquad (1)$$

L11: length of the first grooves along the first direction,
δ: angle of incidence of light on the first light guide,
26.5°: angle of incidence at which light is made incident on the first light guide at a small loss, and
d: thickness of the first light guide, and
a contact angle of the protruding portion is formed according to the following equation (2)

$$\theta = \frac{\arcsin\left(\sin 2\theta_0 \frac{\tan 26.5°}{\tan \delta}\right)}{2} \qquad (2)$$

θ: contact angle of the protruding portion, and
Lo≥2 mm and θo≥2°.

* * * * *